United States Patent [19]
Hashimoto et al.

[11] 4,127,242
[45] Nov. 28, 1978

[54] MAGNETIC RECORDING TAPE CARTRIDGE

[75] Inventors: Noritsugu Hashimoto; Shigeo Sasaki, both of Kyoto, Japan

[73] Assignee: Hitachi Maxell, Ltd., Ibaragi, Japan

[21] Appl. No.: 816,807

[22] Filed: Jul. 18, 1977

[30] Foreign Application Priority Data

Jul. 16, 1976 [JP] Japan .............................. 51-95582[U]
Mar. 18, 1977 [JP] Japan .............................. 52-33490[U]

[51] Int. Cl.² .......................... G03B 1/04; G11B 15/32
[52] U.S. Cl. .................................................. 242/199
[58] Field of Search ............... 242/197, 200, 55.19 A; 352/72, 78 R; 360/60, 132

[56] References Cited
U.S. PATENT DOCUMENTS

| 3,620,480 | 11/1971 | Knox | 242/199 |
| 3,712,559 | 1/1973 | Schwartz | 242/199 |
| 3,826,489 | 7/1974 | Watkins, Jr. | 360/132 |

Primary Examiner—Leonard D. Christian
Attorney, Agent, or Firm—Birch, Stewart, Kolasch and Birch

[57] ABSTRACT

A magnetic recording tape cartridge of a Phillips type which comprises a slip sheet for assuring uniformity of the winding of a tape pack on a hub, said slip sheet being provided with at least three embossed convex ribs of special material radially extended with respect to a pair of drive shaft inserting holes, each of said ribs having closed ends said ribs being disposed on the slip sheet in the positions and the directions specially defined so as to prevent fluctuation of the hub and the tape pack during winding the magnetic recording tape in said cartridge.

8 Claims, 10 Drawing Figures

MAGNETIC RECORDING TAPE CARTRIDGE

BACKGROUND OF THE INVENTION

The present invention relates to a magnetic recording tape cartridge. More particularly, it relates to a magnetic recording tape cartridge wherein at least one slip sheet is placed between the inside surface of the cartridge case and the tape pack.

Figure 1:
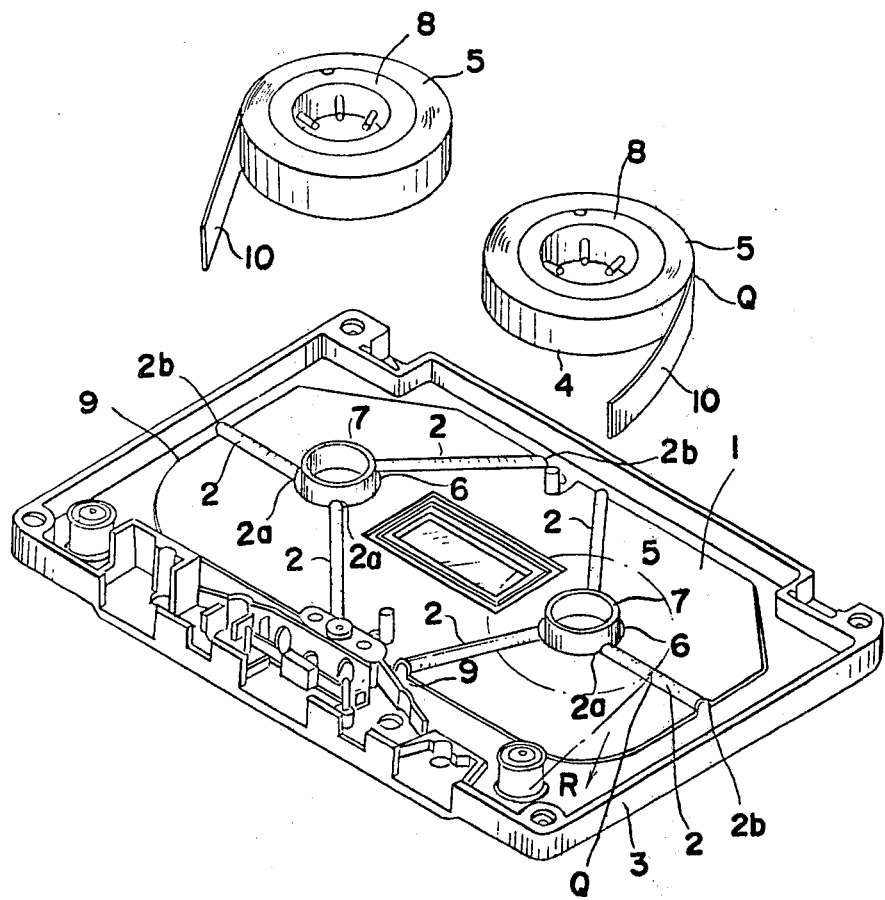

Hitherto, in a magnetic recording tape cartridge there is known to provide a slip sheet between the inside surface of the cartridge case and a tape pack surface so as to prevent loss of levelling of an edge of a roll of magnetic tape wound around a hub. For example, as shown in FIG. 1, U.S. Pat. No. 3,712,559 discloses a constitution of a slip sheet 1 having a plurality of radially extending ribs 2 placed between the inside bottom surface of a case 3 which constitutes the cartridge and the surface 4 of the tape pack 5. In the said patent, each rib 2 of the slip sheet is extended from the hole 6 to accommodate the annular wall 7 which supports a hub 8 to the peripheral edge 9 of the slip sheet 1 and freed at the respective ends 2a and 2b. Accordingly, each rib 2 is apt to be flattened under the weight of the tape pack 5 as indicated in an alternate long and short dash line in FIG. 2, making it difficult to keep the edge level of the tape pack 5 at a fixed position.

Moreover, in the conventional slip sheets considerations on the positions for forming the convex ribs 2 and their numbers have been deficient because of the insufficient recognition of the relation between the factors to cause fluctuations of the hub 8 and the convex rib 2. For example, despite the fact that the tension of the magnetic recording tape 10 applied to the tape pack 5 is an important factor to cause fluctuations of the hub 8, no sufficient recognition has been made on the relationship between the position at which the tension acts and the position of the convex rib 2. For these reasons, in the conventional slip sheet 1, the convex ribs 2, though provided, have not been successful in displaying the desired effect.

An object of the present invention is to provide a magnetic recording tape cartridge of a construction wherein at least one slip sheet is placed between the inside bottom surface of the cartridge case and the hub around which a magnetic tape is wound, designed to suppress effectively the fluctuation of the hub in the course of the use and to take up the magnetic recording tape uniformly at all times.

Another object of the invention is to provide a magnetic recording tape cartridge provided with a slip sheet in which the ribs are so formed that each convex rib is closed with its both ends, thereby preventing a deformation of the ribs.

A further object of the invention is to provide a magnetic recording tape cartridge in which the ribs formed on the slip sheet are arranged to the optimum positions so as to permit winding of the magnetic recording tape uniformly.

Figure 2:
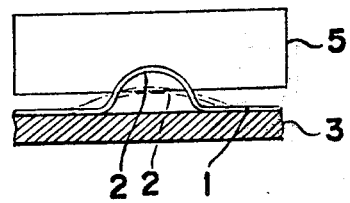
Figure 3:
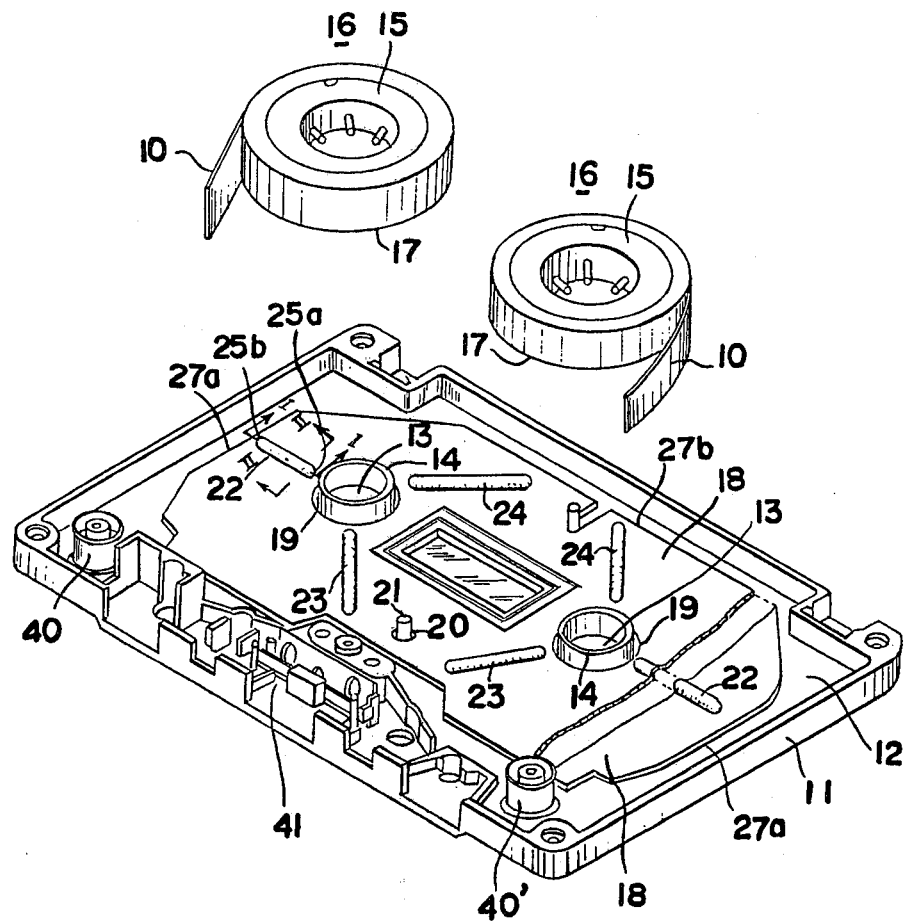
Figure 4:
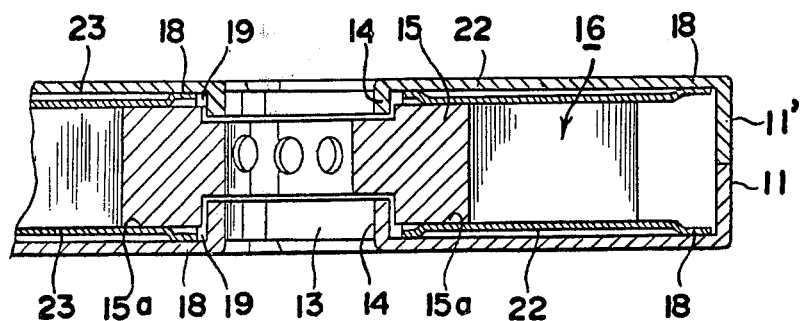
Figure 5:
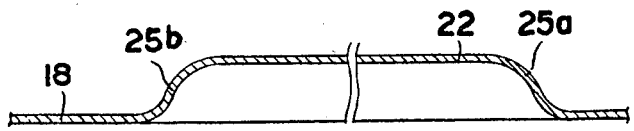
Figure 6:
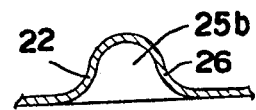
Figure 7:
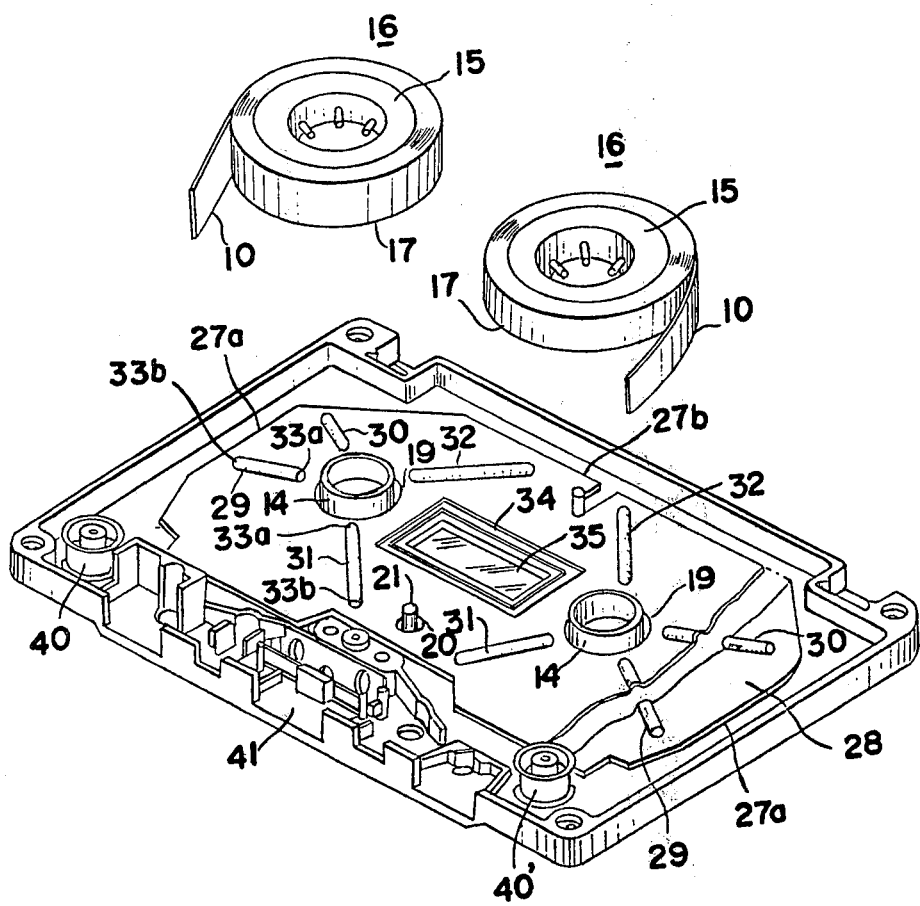
Figure 8:
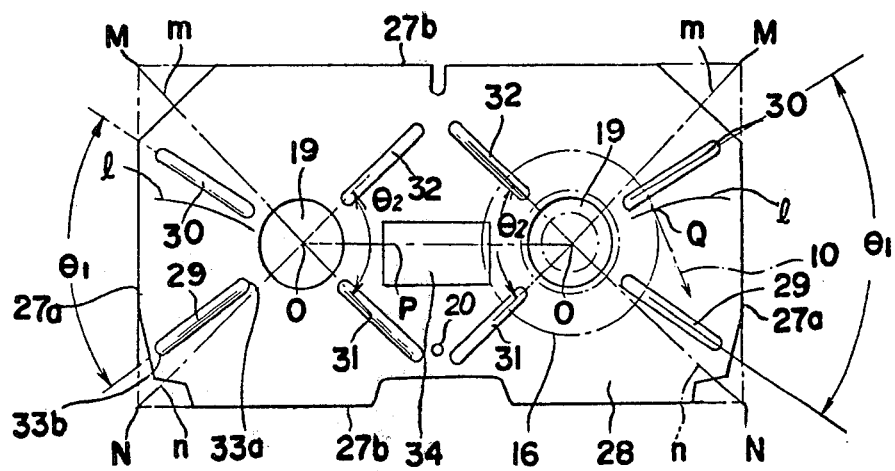
Figure 9:
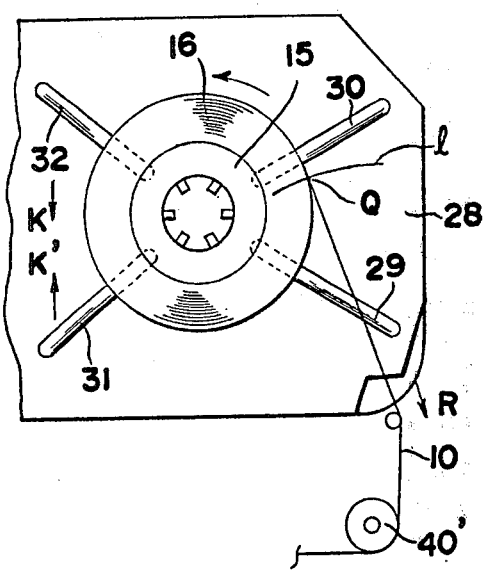
Figure 10:
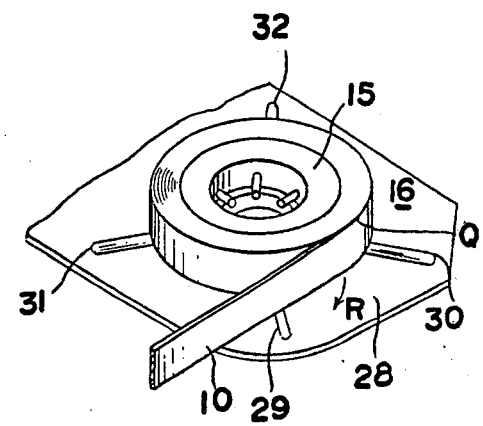

Other objects of the invention will become apparent from the following detailed description made in reference to the accompanying drawings in which, FIG. 1 is a perspective view of a disassembled conventional magnetic recording tape cartridge showing the lower half portion after removal of the upper case and the upper slip sheet, FIG. 2 is a fragmentary cross-sectional view of the slip sheet used in the conventional magnetic recording tape cartridge, FIG. 3 is a perspective view of a disassembled magnetic recording tape cartridge according to one embodiment of the present invention, showing the lower half portion after removal of the upper case and the upper slip sheet, FIG. 4 is a fragmentary cross-sectional view of the essential part of FIG. 3, FIG. 5 is a cross-sectional view of the rib of the slip sheet of FIG. 3 taken along the line I — I, FIG. 6 is a cross-sectional view of the slip sheet of FIG. 3 taken along the line II — II, FIG. 7 is a perspective view of a disassembled magnetic recording tape cartridge according to another embodiment of the present invention, showing the lower half portion after removal of the upper case and the upper slip sheet, FIG. 8 is a plan view of the slip sheet to be used in the embodiment of FIG. 7, FIG. 9 is a plan view of the slip sheet partly cut out for the purpose of illustrating the action of the slip sheet, and FIG. 10 is a perspective view of the portion shown in FIG. 9.

In each figure illustrated, same numbers have been assigned to the same portions of constitution.

Referring to FIGS. 3 and 4, a lower case 11 molded with a synthetic resin such as ABS resin, styrene resin, etc. is combined with an upper case 11' (not shown in FIG. 3) to constitute a standard magnetic recording tape cartridge of Phillips type. On the inside bottom surface 12 of the lower case 11 there are protrusively provided a pair of annular walls 14, which define the holes 13 through which the tape hub driving shafts (not illustrated) of a magnetic tape recorder are inserted. On the annular walls 14, there are rotatably mounted hubs 15 around which a magnetic recording tape 10 is wound. According to the known manner the recording tape 10 is led through the portion 41 to receive a magnetic head along a pair of guide rollers 40 and 40'. On the inside bottom surface 12 of the lower case 11 is a slip sheet 18 on which a tape pack 16 is placed. The slip sheet 18 is formed with drive shaft inserting holes 19 to accommodate the annular walls 14 and a hole 20 to receive a position setting pin protrusively provided on the inside bottom surface 12 of the lower case 11, by which the slip sheet 18 is set in position.

The slip sheet 18 is constituted by a sheet of about 90μ in thickness comprising a plastic film of fluorine resin such as tetrafluoroethylene, polycarbonate resin, polyethylene resin, or polyester resin, a sheet of paper impregnated with silicon oil or the like, or a metal foil of aluminium, copper, etc.

On the slip sheet 18, there are disposed three convex ribs 22, 23, and 24 which radially extend with respect to each drive shaft inserting hole 19 in a manner to substantially to divide the area around the hole 19 into three sections. The convex surfaces of these ribs 22, 23 and 24 are so arranged as to contact the bottom surface 17 of the tape pack 16. The height of projection of the ribs 22, 23, and 24 is set to a level nearly equal to or slightly higher than the clearance between the inside bottom plane of the case and the surface 15a of the hub 15, when, as shown in FIG. 4, a slip sheet 18 and a tape pack 16 are placed in the lower case 11, and the upper case 11' is combined with the lower case 11. By this setting of the projection of the ribs, the hub 15 and the tape pack 16 are at all times elastically supported on the ribs 22, 23, and 24 by the elastic force of the rib. In the standard Phillips magnetic recording tape cartridge like the present embodiment, the ribs 22, 23, and 24 are protruded from the lower surface of the slip sheet 18 at a height of about 0.2 to 1.0 mm and a width of about 3 to 5 mm.

Also, each of the convex ribs 22, 23, and 24 is closed at both ends 25a and 25b. Each rib has its one end at a point within a range of a circle defined by the radius of the hub 15 and the other end at a point inward of and in the vicinity of the peripheral edge 27a and 27b of the slip sheet 18. Said other end may be situated at any point outside the range of radius of said hub. Thus, each rib is less apt to be deformed even at its end portions.

Because of the constitution as above, the height of projection of the ribs 22, 23 and 24 is less apt to vary even under the load applied by the tape pack 16, the magnetic tape 10 is taken up nearly on a constant level, and a pitching of the tape 10 during winding is absorbed by the elasticity of the ribs 22, 23, and 24. The tape pack 16 is stably held in position, the tape 10 can be taken up in such manner that the edges of the tape are kept substantially on the same level and the tape can maintain stable recording and reproducing characteristics.

Also, as shown in FIG. 4, when the slip sheets 18 are placed on the upper case 11' and the lower case 11 respectively and arranged so that the convex ribs 22, 23 and 24 of the upper and the lower slip sheets 18 hold the hub 15 and the tape pack 16 therebetween, pitching of the magnetic recording tape 10 is favorably suppressed by the elastic force of the ribs 22, 23 and 24 without damaging the edge of the tape 10.

The convex ribs 22, 23 and 24 of the slip sheet 18 may be formed by molding simultaneously with the formation of a sheet. Alternatively it may be formed by embossing a plastic sheet or a metal foil. When a rib 22 is formed by embossing, the rib 22 has an advantage of increased mechanical strength and a tendency to cause less variation to its level of projection even under the load of the tape pack 16, because of the stretch of the rising part 26 (ref. FIG. 6) thereof. When a slip sheet 18 having relatively rich softness is used, stretching of the rib in embossing can be made adequately with ease without causing a breakage at the rising part 26 of the rib 22.

As the materials suitable for satisfying such demand, there is a fluorine resin such as tetrafluoroethylene known as Teflon. When this fluorine resin is used as a slip sheet 18, it is possible not only to make stretching of the rising part 26 of the rib 22 easily and appropriately but also to lessen the friction resistance of the hub 15 and the tape pack 16 and permit their smooth rotation. Further, the slip sheet 18 may be admixed with carbon black, graphite, etc. so as to have good electric conductivity, by which a static charge which is liable to be induced by the friction with the hub 15 and the tape pack 16 can be suppressed. In consideration of the antistatic action and the stretching action of the above rising portion, the amount of carbon black or graphite to be admixed is perferably 5 to 30% by weight to the total amount of the slip sheet.

When three ribs 22, 23, and 24 are provided radially around the drive shaft inserting hole 19 in such positions as substantially to divide the area surrounding the hole 19 into at least three sections at nearly equal space, the hub 15 and the tape pack 16 are stably supported on at least three points. Of these ribs, at least one rib 22 is desirably disposed in a direction toward one peripheral side 27a of the slip sheet 18.

Another aspect of the invention is then illustrated with reference to FIGS. 7 and 8. A slip sheet 28 to be used in another example of the invention is constituted by a sheet of about 90μ in thickness comprising a fluorine resin admixed with about 15% by weight of graphite. This slip sheet 28 is provided radially around each drive shaft inserting hole 19 with four stripes of convex ribs 29, 30, 31, and 32 protruding from the lower surface of the sheet 28 each at the height of about 0.2 to 1.0 mm and the width of about 3 to 5 mm by embossing, with their convex surfaces directed toward the tape pack. Each of the convex ribs 29, 30, 31, and 32 is closed at both ends 33a and 33b in the same manner as the embodiment shown in FIG. 5. Each rib has its end 33a at a point within a range of a circle defined by the radius of the hub 15 and the other end 33b at a point inward from and in the vicinity of the peripheral edge 27a and 27b of the slip sheet 18. Said other end may be situated at any point outside the radius of said hub. The ribs may be formed by embossing a flat sheet.

Of the four stripes of the convex ribs 29, 30, 31, and 32, the two ribs 29 and 30 extended toward the peripheral side 27a of the slip sheet 28 are positioned on both sides of the locus l defined by the tape take-up point Q of the tape pack 16, which moves according to the winding of the tape. The two convex ribs 29 and 30 may be positioned at least inside the zone defined between the lines m and n formed by connecting the center O of the drive shaft inserting hole 19 and the imaginary corners M and N of the slip sheet 28. Practically, the angle $\theta_1$ between the two convex ribs 29 and 30 is preferably between 45° and 90°. The other pair of ribs 31 and 32 are formed in the directions nearly reverse to the foregoing pair of ribs 29 and 30 and arranged in nearly a symmetric relation to the center line P formed by connecting the centers O of the two drive shaft inserting holes 19. In the present embodiment the angle $\theta_2$ between the two convex ribs 31 and 32 is about 120°, by which the two convex ribs 31 and 32 are so arranged as to be extensible in a relatively long length without being interferred by the convex ribs 29 and 30. The reference numeral 34 is an opening for a viewing window 35 of the case 11 to permit looking at the volume of tape pack 16.

The convex ribs 29 and 30 are positioned symmetrically with respect to the center line P as described above. Because of the above construction, when the load of the tape pack 16 is impressed on the ribs 29 and 30, both the pressures for flattening the ribs 29 and 30 and the pressure forces exerted to the directions indicated in arrow marks K, K' (FIG. 9) and are offset by the mutual repulsive force of the ribs, and the ribs are less apt to deform in any direction. Moreover, because the convex ribs 29 and 30 act each other to prevent their flattening, the ribs are capable of supporting the tape pack 16 at all times on a position kept at nearly a fixed space from the bottom surface of the case 11.

Also, since the hub 15 and the tape pack 16 are supported by means of the four radially disposed convex ribs 29, 30, 31, and 32, on the four divisional lines, they are prevented from inclining to any side and are free from rolling or pitching in rotation. In a conventional cartridge in which, as shown in FIG. 1, the slip sheet is provided with a convex rib 2 on the take-up side of the tape pack, when an inclined tension R (FIG. 1, FIG. 9 and FIG. 10) caused by pitching of the tape 10 is applied to the tape take-up point Q of the tape pack 5, the tape pack is inclined to swing at the fulcrum of the convex rib 2. However, in case of the use of a slip sheet 28 according to the present invention, because of the arrangements of the convex ribs 29 and 30 on both sides of the take-up point Q of the tape pack 16, the tape pack 16 is prevented from swinging, and does not cause rolling or pitching to any side. This action can sufficiently be displayed provided that the convex ribs 29 and 30 are situated on both sides of the locus 1 and inside the area surrounded by the lines m and n of the slip sheet 28.

As described above, when a slip sheet 28 provided with four convex ribs 29, 30, 31, and 32 around the drive shaft inserting hole 19 is used, the hub 15 and the tape pack 16 are supported on the four divisional lines by the four convex ribs which are less apt to be deformed due to their closed ends, because of which the fluctuations such as pitching or pulsatory motion in the tape running are effectively suppressed and irregular formation of the edge level of the tape pack 16 is prevented.

Especially, because the rolling of the tape pack 16 caused by the tension exerted thereto by the magnetic tape 10 is prevented by a pair of convex ribs 29 and 30 extended toward the right and the left peripheral sides of the slip sheet 28, pulsatory motion of the tape pack 16, which has hitherto not been sufficiently suppressed, can be steadily inhibited.

When the angle between the symmetric convex ribs 29 and 30 extended toward the right and left peripheral sides 27a of the slip sheet 28 is smaller than 45°, the space between these ribs 29 and 30 is narrowed to provide a difficulty to the embossing work. However, when the two stripes of ribs 29 and 30 are disposed at an angle in the range of 45° to 90°, molding of the slip sheet is facilitated and yet the pulsatory motion of the tape pack is effectively decreased.

The symmetrical arrangements of one group of the convex ribs centering on one of the pair of the drive shaft inserting holes with the other group of convex ribs centering on the other drive shaft inserting hole are also effective for preventing the fluctuation of the tape pack in fast foward or rewinding operations of the tape.

What is claimed is:

1. A magnetic recording tape cartridge which comprises a casing composed of first and second plates joined together to provide a tape chamber, at least one of said first and second plates having a pair of spaced holes, a pair of hubs having respective openings adapted to permit insertion of a drive shaft therethrough and housed within said tape chamber with said openings respectively aligned with said holes on either of the first or second plates, at least one slip sheet having long and short sides positioned within the tape chamber and sandwiched between the hubs and either one of said first and second plates, said slip sheet having a pair of drive shaft inserting holes and a plurality of resilient hollow convex ribs radially extending around each of said drive shaft inserting holes, each of said ribs being closed at both ends so that one end is situated at a point within a range of a circle of the shape of the hub to be placed on the drive shaft inserting hole and the other end at a point outside of the circle of the shape of said hub, said ribs being provided at least three in number around each drive shaft inserting hole in a manner to substantially divide the area surrounding said drive shaft inserting hole into at least three sections, at least one of said ribs being directed toward and terminating at or within a short side of the slip sheet, said slip sheet being inserted so that the convex ribs face the tape pack.

2. The magnetic recording tape cartridge according to claim 1, wherein a pair of the slip sheets are positioned on both sides of the hub and the tape pack in the tape chamber so as to hold the hub and the tape pack between the convex ribs of said pair of slip sheets.

3. The magnetic recording tape cartridge according to claim 1, wherein the slip sheet is constituted by fluorine-resin and the convex rib is formed by embossing.

4. The magnetic recording tape cartridge according to claim 1, wherein the convex ribs are formed in four stripes which substantially divide the area surrounding each drive shaft inserting hole into four sections, and a pair of ribs are located inside the zone surrounded by the lines formed by connecting the center of the drive shaft inserting hole and the imaginary corners of the slip sheet and the other pair of ribs are arranged in reverse disposition to the former pair of ribs, and the former pair of ribs are provided on both sides of the locus defined by the tape take-up point of the tape pack.

5. The magnetic recording tape cartridge according to claim 4, wherein the angle included by a pair of ribs to be formed inside said zone is in the range of about 45° up to 90°.

6. The magnetic recording tape cartridge according to claim 4, wherein the group of convex ribs are so arranged that one group of convex ribs formed around one of a pair of drive shaft inserting holes is symmetric with respect to the other drive shaft inserting hole.

7. The magnetic recording tape cartridge according to claim 4, wherein the slip sheets are constituted as a main component by a fluorine-resin and the convex ribs are formed by embossing.

8. The magnetic recording tape cartridge according to claim 7, wherein the slip sheets contain 5 to 30% by weight of a graphite.

* * * * *